ized as follows:

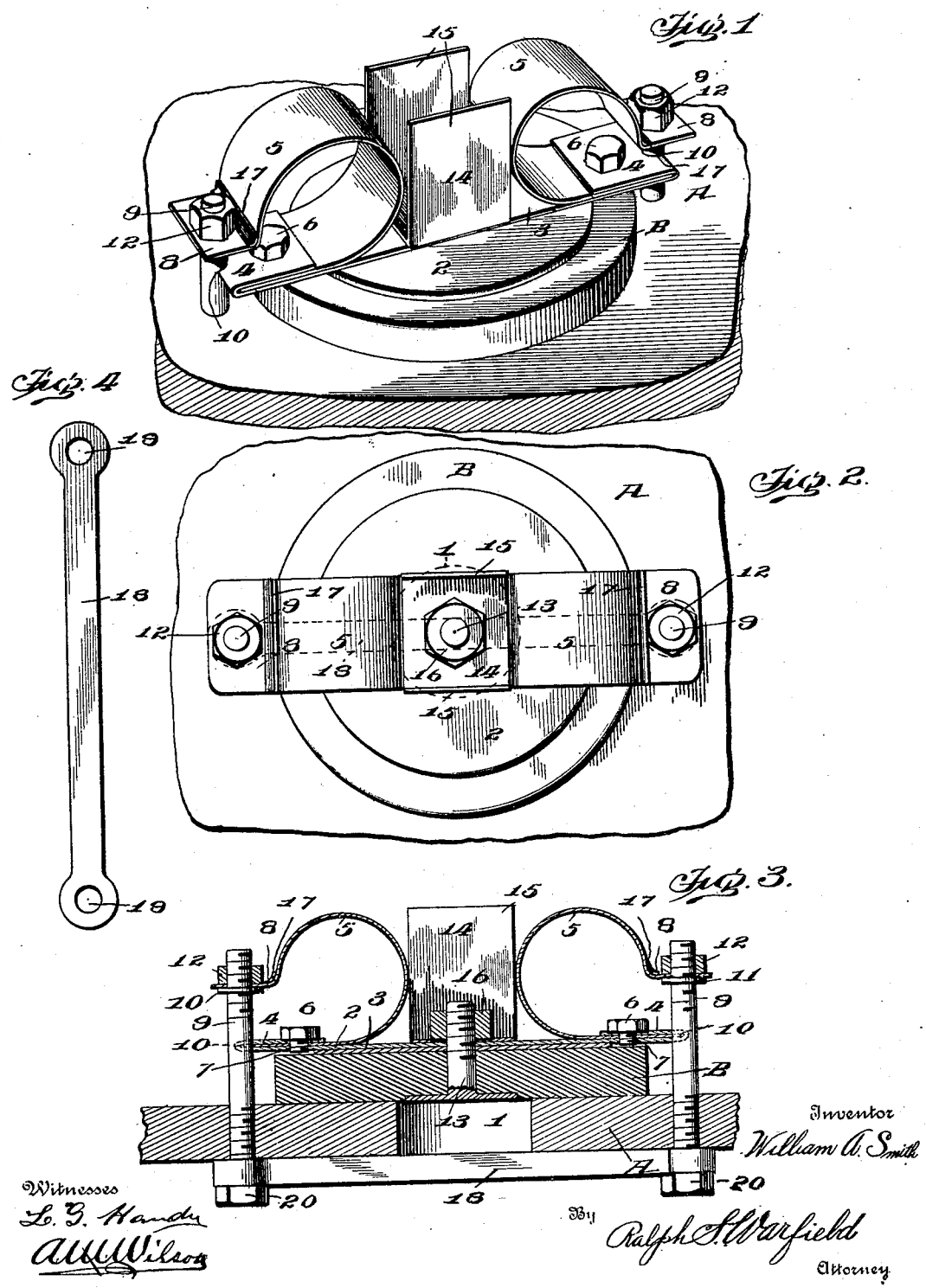

UNITED STATES PATENT OFFICE.

WILLIAM A. SMITH, OF BEVIER, KENTUCKY, ASSIGNOR OF ONE-HALF TO JAMES W. MOORES, OF RUSSELLVILLE, KENTUCKY.

VALVE.

SPECIFICATION forming part of Letters Patent No. 711,792, dated October 21, 1902.

Application filed January 31, 1902. Serial No. 91,996. (No model.)

*To all whom it may concern:*

Be it known that I, WILLIAM A. SMITH, a citizen of the United States of America, residing at Bevier, in the county of Muhlenberg and State of Kentucky, have invented certain new and useful Improvements in Valves, of which the following is a specification.

My invention relates to an improvement in valves, and more particularly to that class of valves employed in connection with pumps and pumping systems installed in waterworks, pumping-stations, and the like. It is also designed as an improvement over such valves which have been heretofore used in connection with the heavy steam or force pumps which are adapted to raise the water from mines or other shafts. This water, be it known, is generally, if not always, deeply impregnated with acid—as in coal-mines, for example—which acid is derived from the mineral and metallic deposits in the earth, and when such waters come in contact with the metallic portions of the valves, especially where there is any wear, the acid therein eats into and soon renders the valve worthless. A valve much used in this connection was one which comprised, among other features, a rubber disk provided with a guard-plate and adapted to reciprocate against the tension of a spiral spring located upon a stationary valve-stem extending through the center of the rubber disk and guard-plate. Valves of this class never remain intact more than a few months and generally need to be replaced every month, which limit of time amounts approximately to the length of their usefulness, owing to the fact that the valve-stem, with the assistance of the acid and rough water, wears away the sides of the central aperture in the rubber disk until the valve slips to one side and fails to rest properly on its seat. The attrition of the spiral spring and valve-stem serves to mutually weaken them, and consequently valves of this type are a constant expense and require the utmost care and attention. These valves, however, have been in use for a long time in default of something better, and hence there are large accumulations of old valves and rubber disks on hand which have been cast aside. With my invention I can make use of these old accumulations of rubber disks, which heretofore have been worthless, and which fact alone amounts to a great saving in the expense attendant upon the manufacture of my device; and my invention consists in a valve reciprocating between guiding means, the construction being provided with tension devices secured to both the valve and the guiding means, the valve-disk being provided with a plate having sliding contact with the guiding means in order to maintain the vertical reciprocations of the valve and insure its return to its seat.

My invention also consists in a valve provided with a guide-plate having recesses formed therein for the reception of guiding rods or bolts, the valve adapted to reciprocate between the rods or bolts, and springs connected to the guide-plate and to the rods or bolts, the springs constituting the sole connection therebetween and against the tension of which the valve is adapted to move in one direction, and a stop located on the guide-plate between the springs whereby to limit the outward movement of the valve from its seat.

My invention further consists in certain other novel features of construction and combinations of parts, which will be more fully described in detail hereinafter and particularly pointed out in the claims.

In the accompanying drawings, Figure 1 is a perspective view of my invention in position on the bridge located in the cap of a steam or other suitable pump. Fig. 2 is a top plan view. Fig. 3 is a vertical section taken centrally through the valve, portions thereof being shown in full lines; and Fig. 4 is a detail view of the stop-rod.

A indicates the bridge, upon which the valve rests. This bridge, as shown, is provided with a port 1, through which water or other fluid is intermittently forced. The port is preferably of circular form, as shown; but it may, of course, be of any particular shape or size desired, or it may consist of more than one opening arranged in any symmetrical design. A circular or disk-shaped valve B, of rubber or other suitable material, preferably flexible, is located over this port and in contact with the bridge. This valve may be of any desired shape to cover the port and of any desired thickness; but care must be taken to provide a valve of sufficient size to fully cover the port 1 and to lie flat upon the bridge in order that it may adhere properly to its seat and for a sufficient space therearound on the backward or return stroke of the piston. This disk used in my construction is the one which is adapted from those used in the former valve constructions, large accumulations of which are to be found at any pumphouse where the former valves have been in use. Thus a good deal of expense is saved, as when the rubber disks need replacing one of the old valve-disks can be substituted therefor with but little change. A guard or stiffening plate 2, of phosphor-bronze and preferably of larger area than the port-opening, is placed concentrically on the upper side of the flat disk B to prevent the flexible disk from buckling under the pressure exerted thereupon, and extending diametrically across the guard-plate and disk is a rectangular guide-plate 3, the opposite ends of which extend beyond the edges of the disk B and are folded back upon themselves to afford additional strength at the ends, as at 4 4. This guide-plate, like the guard-plate, is of phosphor-bronze, the reason being that this metal is unaffected by the acid or alkaline waters so prevalent in many portions of the country. Hitherto waters of this character have eaten away or corroded the metallic fixtures of valves and other operative portions of mechanisms to such an extent as to involve a considerable expense in replacing the worn-out structures. My invention is particularly adapted for use with such waters, being contrived with this especial purpose in view, and my experiments have proven that phosphor-bronze is the best if not the only material of which the valves can be constructed to the most advantage in such places where acid or alkaline waters are to be found.

Bow-springs 5 5 are provided. These springs are also composed of phosphor-bronze, and one end of each spring is inserted between the main portion of the guide-plate 3 and the rearwardly-bent or folded ends 4 4 thereof, which serves to retain the springs in position. Bolts 6 6 pass through apertures 7 7 in the guide-plate, its rearwardly-folded ends, and the ends of the springs 5 5, whereby to securely fasten them to the guide-plate. The opposite or upper ends of the bow-springs terminate in horizontally-offset flanges 8 8, having apertures formed therein. The greatest amount of strain on the springs occurs at this exact point at which the flanges 8 8 join the curved portions of the springs, and to prevent any liability of breakage at this juncture I provide splices 17, which are securely fastened to the spring-body by welding or riveting, as seems most desirable. I may employ either a single heavy plate or splice or a plurality of lighter splices, which in the latter event would be graduated in size, the longest at the bottom in direct contact with the spring-body and the shortest on the top. Either plan will be equally satisfactory.

Guide or stay bolts 9 9 are screwed or otherwise secured in the bridge on either side of the disk valve B and diametrically opposite each other. These bolts 9 9 are spaced a short distance apart from the outer circumference of the disk valve B, and each bolt is located at an equal distance from the central point thereof and of the guard-plate 2 and port 1 in order that there may be no binding or catching of the valve on the bolts 9 9 during its reciprocations.

Recesses 10 10 are formed in the projecting ends of the folded portions 4 4 of the guide-plate 3, as well as in the lower ends of the bow-springs 5 5, which recesses fit partially around the bolts 9 9 and serve to guide the valve in its upward and downward movements to and from its seat.

The bolts 9 9 are provided with shoulders 10 11 near their upper or outer ends, and the upper ends of said bolts are adapted to be received in the apertures formed in the flanged ends of the bow-springs 5 5, which flanged portions 8 8 fit squarely upon the shoulders 10 11 and are held in place by means of nuts 12 12 or other securing means located on the upper ends of the bolts 9 9.

As a means for retaining the guide-plate 3, guard-plate 2, and disk B together I provide a bolt 13, the head of which is received in a countersink formed in the center of the lower face of the disk B, wherein the head of the bolt 13 fits snugly and is in the same plane with the surface of the disk. The bolt 13 passes through the disk B and through apertures formed centrally of the guard and guide plates, and superposed upon the latter plate between the bow-springs 5 5 is a stop 14, comprising a horizontal body portion and upstanding arms 15 15 at right angles thereto. The bolt 13 passes through an aperture formed centrally of the body portion of the stop and is provided with a nut or other securing means 16, which when screwed into place serves to hold the elements comprising the valve together to constitute practically a single integral disk flexible at its circumference. The upstanding arms 15 15 of the stop extend to a point slightly above the plane of the bow-springs, and these arms are adapted to impinge against a stop-rod or other suitable stationary point to prevent the valve from rising too far from its seat to a point where the springs would act in a direction the reverse of their normal tendency, as well as to prevent too great a strain being placed thereon.

In case a plurality of valves are employed one above another the guide-bolts 9 9 are extended through the bridge, and a bar or rod 18, having eyes 19 19 at each end, is located upon the lower projecting ends of the guide-bolts. These projecting ends are threaded for the reception of nuts 20 20 or other securing means, which retain the bolts 9 9 and the stop-rod 18 securely in position. Now were it not for the stop-rods the force of the water might carry the upstanding arms of the stop 14 through the port-openings above them and operate to raise the valves covering such ports, but instead the arms 15 strike against the stop-rods 18 and are prevented from further upward movement thereby. The stop-arms 15 15 on the upper tier of valves impinge against the interior of the cap of the pump.

All the working parts and, indeed, all the metallic portions of the valve are composed of phosphor-bronze, for the reasons heretofore set forth.

An idea of the operation of my construction may be gathered from the foregoing description, but a brief recapitulation thereof will be here set forth.

The piston of the pumping or other engine forces a column of water through the port 1, located in the bridge and against the under face of the disk B, which is thereby forced upwardly against the tension of bow-springs 5 5, the recesses 10 10 in the guide-plate, which fit snugly about bolts 9 9, serving to retain the valve in a horizontal position and at the same time guiding it in its reciprocations. As soon, of course, as the valve rises from its seat the water will escape beneath it into a pipe or other chamber, and as soon as the force with which the water is expelled diminishes to and is equalized by the force or tension of the springs the valve will cease to rise and the next moment will commence its descent. This occurs at the interval between the end of the outward stroke and the beginning of the backward stroke of the piston, and the valve will quickly return to its seat to prevent the access of the expelled water to the port 1, as well as to prevent the pounding which will be caused by the return stroke of the piston if the valve is not tightly seated before its commencement.

There are but few parts to wear out on my device, since the number of working parts subject to attrition has been reduced to the minimum, and the only friction liable to occur is between the guide-plate 3 at its recesses 10 10 and the guide-bolts 9 9, which at most is very slight.

My invention is not limited in its use to a steam-pump, but may be applied in any connection wherever a valve of this nature is employed, and hence it is evident that slight changes might be made in the form and arrangement of the several parts described without departing from the spirit and scope of my invention, and therefore I do not wish to limit myself to the exact construction herein set forth; but, Having thus fully set forth my invention, what I claim as new, and desire to secure by Letters Patent, is—

1. A valve comprising a disk, a guide-plate secured thereto and having holes formed therein, guide-bolts received within the holes to guide the valve in its movements, enlargements located on the guide-bolts, and tension means, the lower ends of which are secured to the guide-plate, the upper ends adapted to lie against the enlargements on the guide-bolts, and means on the guide-bolts in contact with the tension means for removably retaining the upper ends thereof securely in position.

2. A valve comprising a valve-disk, a guide-plate secured therewith, the ends of the guide-plate projecting beyond the edges of the valve-disk and folded backward over the guide-plate, guide-bolts located opposite the ends of the guide-plate, the guide-bolts received in recesses formed in the folded ends of the guide-plate and springs, the lower ends of which springs are received in and fastened between the folded ends of the guide-plate, the upper ends of the springs being secured to the guide-bolts.

3. The combination with a valve-disk, of a guide-plate thereon, bolts located apart from and upon either side of the valve-disk, the bolts received in recesses formed in the ends of the guide-plate, springs secured to the guide-plate and to the bolts, respectively, and a stop secured to the valve-disk, the stop provided with upstanding arms whereby to limit the outward movement of the valve-disk.

4. The combination with a valve-disk, of a guide-plate thereon, bolts located apart from and upon either side of the valve-disk, the bolts received in recesses formed in the ends of the guide-plate, springs secured to the guide-plate and to the bolts, respectively, and a stop secured to the valve-disk and moving therewith whereby to limit the outward movement of the valve-disk.

5. A valve comprising a rubber disk, a stiffening-plate therefor, a guide-plate having folded ends, the folded ends extending beyond the edge of the disk and having recesses formed therein, a stop on the guide-plate, the stop provided with upstanding arms, the disk, stiffening-plate, guide-plate and stop connected and secured together, guide-bolts secured to some suitable support, the guide-bolts received in the recesses formed in the ends of the guide-plate, shoulders on the bolts, bow-springs, the lower ends of which extend between the folded ends of the guide-plate where they are secured, the upper ends of the springs provided with flanges having apertures formed therein, the flanges fitting against the shoulders on the bolts which latter project through the apertures, and means on the bolts for firmly retaining the flanged portions of the springs against the shoulders.

6. A valve comprising a flexible disk, a guide-plate secured therewith the open slotted ends of the guide-plate extending beyond the edge of the disk, guide-bolts located apart from the disk and received in the open slotted ends of the guide-plate, bow-springs secured to the valve at their lower ends, their upper ends provided with flanges connected to the guide-bolts and splices secured to the springs at the juncture of the flanges with the curved portions thereof.

7. A valve comprising a flexible disk, a guide-plate secured therewith, guide-bolts secured to and projecting below a suitable support, the guide-plate contacting with the guide-bolts whereby the valve is guided in its movements, tension devices secured to the valve and to the bolts whereby to actuate the valve in one direction and a stop-rod secured to and connecting the projecting ends of the guide-bolts.

8. A valve comprising a disk, a guide-plate secured thereto, guide-bolts located without the edges of the disk and out of contact therewith, the recessed ends of the guide-plate being folded backward and projecting beyond the edges of the disk, the guide-bolts embraced by the recessed ends of the guide-plate whereby the valve is guided in its movements and tension devices secured to the guide-plate between the folded portions thereof and to the bolts, respectively.

9. A valve comprising a disk, a guide-plate superposed thereupon, guide-bolts located without the edges of the disk and out of contact therewith, the recessed ends of the guide-plate being folded backward and projecting beyond the edges of the disk, the guide-bolts embraced by the recessed ends of the guide-plate whereby the valve is guided in its movements, a stop-rod secured to the ends of the bolts and stop-arms secured to the valve, the arms adapted to contact with the stop-rod to limit the upward movement of the valve and tension devices secured to the guide-plate between the folded portions thereof, and to the bolts, respectively.

10. A valve comprising a flexible disk, a guide-plate secured therewith, guide-bolts located apart from the disk and secured to and projecting below a stationary support, the guide-plate contacting with the guide-bolts whereby the valve is guided in its movements, tension devices secured to the valve and to the bolts whereby to actuate the valve in one direction and a stop-rod secured to and connecting the projecting ends of the guide-bolts.

11. A valve comprising a disk, a guide-plate rigidly secured thereto, guide-bolts, the guide-plate adapted to embrace the guide-bolts to guide the valve in its movements, tension devices for actuating the valve in one direction, stop-arms rigidly secured to the valve and projecting therefrom in the direction of travel of the valve away from its seat and a stop-rod connecting the guide-bolts, the stop-arms adapted to contact with the stop-rod to limit the travel of the valve.

12. A valve comprising a disk, a guide-plate secured thereto, the guide-plate provided with recesses formed therein, guide-bolts adapted to be received in the recesses, shoulders formed on the bolts and U-shaped plate-springs, the ends of which are secured to the guide-plate, the opposite ends of the springs provided with perforated offset flanges, the guide-bolts received in the perforations in the flanges, the flanges adapted to lie against the shoulders on the bolts and means for removably retaining the flanged ends of the springs rigidly in place.

In testimony whereof I have signed my name to this specification in the presence of two subscribing witnesses.

WILLIAM A. SMITH.

In presence of—.
  J. G. HENDRICK,
  G. W. WOODSON.